US011194587B2

(12) United States Patent
Lee (10) Patent No.: US 11,194,587 B2
(45) Date of Patent: Dec. 7, 2021

(54) MEMORY SYSTEM, DATA PROCESSING SYSTEM AND OPERATING METHOD THEREOF

(71) Applicant: SK hynix Inc., Gyeonggi-do (KR)

(72) Inventor: Joo-Young Lee, Seoul (KR)

(73) Assignee: SK hynix Inc., Gyeonggi-do (KR)

( * ) Notice: Subject to any disclaimer, the term of this patent is extended or adjusted under 35 U.S.C. 154(b) by 158 days.

(21) Appl. No.: 16/374,919

(22) Filed: Apr. 4, 2019

(65) Prior Publication Data
US 2020/0057653 A1  Feb. 20, 2020

(30) Foreign Application Priority Data
Aug. 14, 2018 (KR) .......................... 10-2018-0094979

(51) Int. Cl.
*G06F 9/4401* (2018.01)
*G06F 3/06* (2006.01)

(52) U.S. Cl.
CPC .......... *G06F 9/4401* (2013.01); *G06F 3/0652* (2013.01); *G06F 3/0658* (2013.01); *G06F 3/0673* (2013.01)

(58) Field of Classification Search
CPC .. G06F 9/4401; G06F 3/00652; G06F 3/0658; G06F 3/0673; G06F 11/0751; G06F 21/57; G06F 11/0772; G06F 11/073; G06F 11/1048; G06F 9/44
See application file for complete search history.

(56) References Cited

U.S. PATENT DOCUMENTS

| 7,870,378 | B2 | 1/2011 | Kuo et al. |
| 8,713,367 | B2* | 4/2014 | Deng ................. G06F 11/0772 714/23 |
| 2005/0283598 | A1* | 12/2005 | Gaskins ................ G11C 16/20 713/2 |
| 2008/0082814 | A1* | 4/2008 | Kuo ...................... G06F 9/4403 713/2 |
| 2009/0254776 | A1* | 10/2009 | Gonzalez ............ G06F 11/1068 714/6.12 |
| 2018/0095832 | A1* | 4/2018 | Pillilli ................... G06F 9/4416 |
| 2020/0020412 | A1* | 1/2020 | Biberidis ............. G01R 33/072 |

* cited by examiner

*Primary Examiner* — Paul Yen
(74) *Attorney, Agent, or Firm* — IP & T Group LLP (57) ABSTRACT

A data processing system comprising: a host; and a memory system comprising a nonvolatile memory device and a controller suitable for controlling the nonvolatile memory device, wherein the controller comprises: a first reset circuitry suitable for loading firmware from the nonvolatile memory device to a volatile memory, and setting a reset default status; a second reset circuitry suitable for determining whether a reason for a reset request coincides with the reset default status, when the reset request is received from the host, and resetting the memory system; and a firmware load determination circuitry suitable for determining whether to reload the firmware by checking the reset default status.

15 Claims, 9 Drawing Sheets

MEMORY SYSTEM, DATA PROCESSING SYSTEM AND OPERATING METHOD THEREOF

CROSS-REFERENCE TO RELATED APPLICATION

This application claims priority under 35 U.S.C. § 119 to Korean Patent Application No. 10-2018-0094979 filed on Aug. 14, 2018, which is incorporated herein by reference in its entirety.

BACKGROUND

1. Field

Various embodiments of the present invention relate to a data processing system including a host and a memory system, and more particularly, to a data processing system for reducing a booting time in case of a reset request from a host, and an operating method thereof.

2. Discussion of the Related Art

Recently, the computer environment paradigm has shifted to ubiquitous computing, which allows computer systems to be used anytime and anywhere. As a result, the use of portable electronic devices such as mobile phones, digital cameras, and notebook/laptop computers has rapidly increased. In general, such portable electronic devices use a memory system which uses a memory device, that is, a data storage device. The data storage device is used as a main memory device or an auxiliary memory device of the portable electronic devices.

Since there is no mechanical driving part, such a data storage device used as a memory device provides advantages such as excellent stability and durability, high information access speed, and low power consumption. Data storage devices having such advantages include a universal serial bus (USB) memory device, memory cards having various interfaces, and a solid state drive (SSD).

SUMMARY

Various embodiments are directed to a data processing system for reducing a booting time in case of a reset request, and an operating method thereof.

In an embodiment, A data processing system comprising: a host; and a memory system comprising a nonvolatile memory device and a controller suitable for controlling the nonvolatile memory device, wherein the controller comprises: a first reset circuitry suitable for loading firmware from the nonvolatile memory device to a volatile memory, and setting a reset default status; a second reset circuitry suitable for determining whether a reason for a reset request coincides with the reset default status, when the reset request is received from the host, and resetting the memory system; and a firmware load determination circuitry suitable for determining whether to reload the firmware by checking the reset default status.

The second reset circuitry comprises a timer suitable for setting a reset time of the memory system, and determines whether the resetting of the memory system failed, using the timer.

The first reset circuitry may set the reset default status to a bit flip error of the volatile memory.

The second reset circuitry may determine whether the reason for the reset request is a bit flip error set to the reset default status, checks the reason for the reset request through the reset request to update the reset default status when the reason for the reset request is not the bit flip error, and then resets the memory system.

The second reset circuitry may comprise a timer suitable for setting a reset time of the memory system, and determines whether the resetting of the memory system failed, using the timer.

The firmware load determination circuitry may check the reset default status determined through the second reset circuitry, and does not load the firmware from the nonvolatile memory device when the reset default status is not the bit flip error. The firmware load determination circuitry may check the reset default status determined through the second reset circuitry, and reloads the firmware from the nonvolatile memory device when the reset default status is the bit flip error. The reset may comprise any one of a hardware reset through which the host directly resets both the controller and the nonvolatile memory device and an end point reset through which the host resets only the nonvolatile memory device through the controller.

In another embodiment, an operating method of a data processing system which includes a host; and a memory system including a nonvolatile memory device and a controller for controlling the nonvolatile memory device, is proposed, the operating method comprising: loading firmware from the nonvolatile memory device to a volatile memory, and setting a reset default status; determining whether a reason for a reset request coincides with the reset default status, when the reset request is received from the host, and resetting the memory system; and determining whether to reload the firmware by checking the reset default status.

The data processing system further may comprise a timer suitable for setting a reset time of the memory system, and determines whether the resetting of the memory system failed, using the timer.

The reset default status may be indicative of a bit flip error of the volatile memory.

The determining of whether the reason for the reset request coincides with the reset default status may comprise determining whether the reset request reason is a bit flip error set to the reset default status, checking the reset request reason through the reset request to update the reset default status when the reset request reason is not the bit flip error, and resetting the memory system.

The determining of whether the reason for the reset request coincides with the reset default status may comprise determining whether the reset request reason is a bit flip error set to the reset default status, maintaining the reset default status as the bit flip error when the reset request reason is the bit flip error, and resetting the memory system.

The determining of whether to reload the firmware may comprise checking the reset default status determined through the determining of whether the reason for the reset request coincides with the reset default status, and not loading the firmware from the nonvolatile memory device when the reset default status is not a bit flip error.

The determining of whether to reload the firmware comprises checking the reset default status determined through the determining of whether the reason for reset request coincides with the reset default status, and reloading the firmware from the nonvolatile memory device when the reset default status is a bit flip error.

The reset may comprise any one of a hardware reset through which the host directly resets both the controller and the nonvolatile memory device and an end point reset through which the host resets only the nonvolatile memory device through the controller.

In another embodiment, a memory system comprising: a memory device suitable for storing firmware; and a controller suitable for controlling the nonvolatile memory device, wherein the controller is configured to: load the firmware from the memory device; reset the memory system according to the reset request, when a reset request is received; determine whether the firmware is to be reloaded based on the reset request; and reload the firmware from the memory device, when it is determined that the firmware is to be reloaded.

DETAILED DESCRIPTION

Various embodiments will be described in detail with reference to the accompanying drawings. However, the present disclosure is not limited to the following embodiment(s), but may be embodied in various other configurations or arrangements. The present embodiments are provided so that this disclosure is thorough and complete and fully conveys the scope of the present disclosure to those skilled in the art. Throughout the specification, reference to "an embodiment," "another embodiment" or the like is not necessarily to only one embodiment, and different references to any such phrase are not necessarily to the same embodiment(s).

Figure 1:
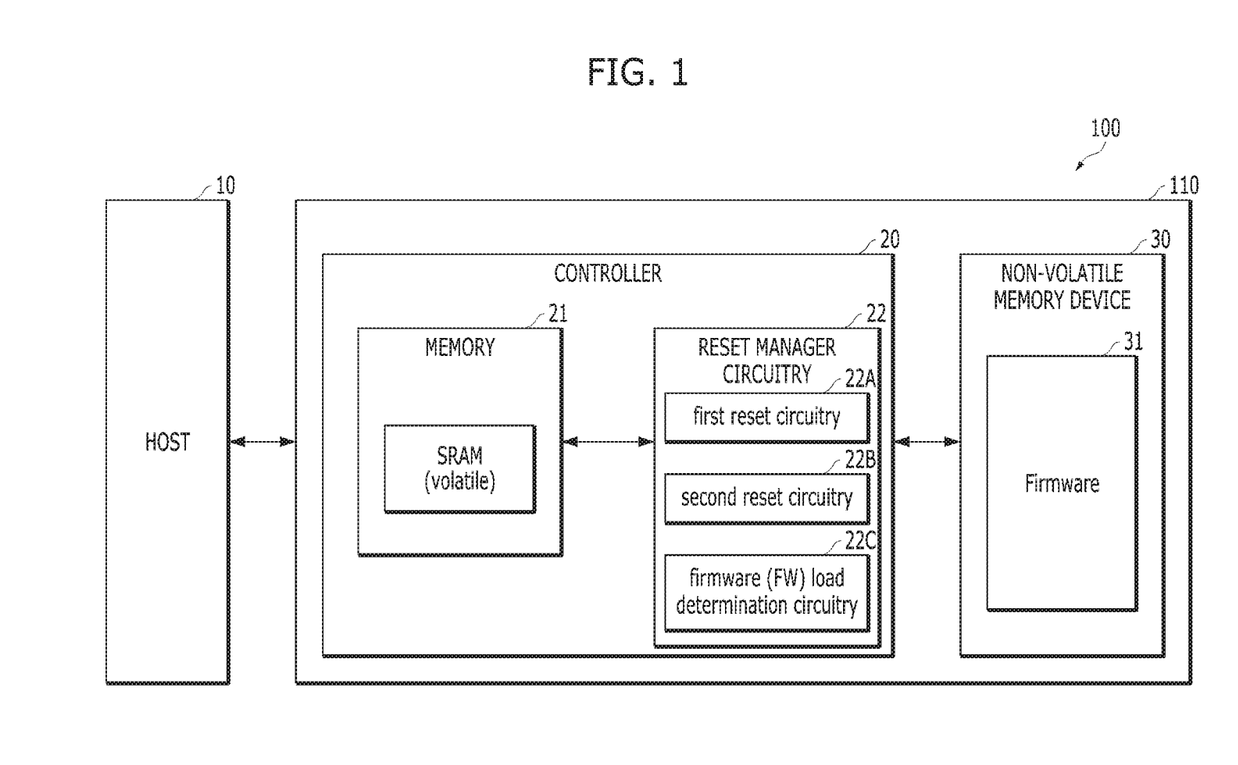
FIG. 1 illustrates a data processing system including a memory system in accordance with an embodiment of the present invention.

FIG. 1 illustrates a data processing system 100 including a memory system 110 in accordance with an embodiment.

Referring to FIG. 1, the data processing system 100 may include a host 10 and the memory system 110. The memory system 110 may include a controller 20 and a nonvolatile memory device 30.

The host 10 may transfer a plurality of commands corresponding to a user request to the memory system 110. Then, the memory system 110 may perform operations corresponding to the commands, i.e., operations corresponding to the user request.

Before describing the memory system 110, the following situation may be assumed: the memory system 110 may receive a reset request from the host 10, when an error occurred during a booting sequence or while the memory system 110 operates based on a normal process after the booting sequence has been normally performed. That is, a reset request may occur due to the following reasons. First, a reset request may occur when firmware is not functioning properly due to a problem in a volatile memory, even though the firmware was normally loaded to a certain region of a memory 21 included in the controller 20, for example, a firmware storage region of the volatile memory. Second, a reset request may occur when a command to change the settings of the memory system 110 is received from the host 10. Third, a reset request may occur due to a link fail or the like. When receiving a reset request from the host 10 for any of the above-described reasons, the memory system 110 may reload the firmware from the nonvolatile memory device 30. However, except the case in which the firmware is not functioning properly due to a problem in the volatile memory, the reasons of the reset request are not caused by damage of the code region. In this case, the firmware does not need to be reloaded from the nonvolatile memory device 30. Therefore, the booting time may be reduced because the controller 20 does not need to reload the firmware from the nonvolatile memory device 30.

There are multiple methods for resetting the memory system 110 according to a reset request from the host 10. A first method is that the host 10 directly resets both of the controller 20 and the nonvolatile memory device 30. In a second method, the host 10 resets only the nonvolatile memory device 30 through the controller 20. One difference between the first and second methods depends on whether the controller 20 as well as the nonvolatile memory device 30 is reset when the memory system 110 is reset according to a request of the host 10. That is, in the first method, both the controller 20 and the nonvolatile memory device 30 are reset. In the second method, however, the controller 20 is not reset only the nonvolatile memory device 30 is reset. For reference, there are different methods to accommodate a variety of hosts 10. That is, as described with reference to FIG. 1, the memory system 110 may be used with various types of hosts 10. Depending on the type of the host 10, the memory system 110 may be reset according to the first method or the second method. In general, the operation of resetting the memory system 110 according to the first method may indicate that the host 10 resets the memory system 110 through a hardware reset method. The operation of resetting the memory system 110 according to the second method may indicate that the host 10 resets the memory system 110 through an endpoint reset method. The hardware reset method to reset both the controller 20 and the nonvolatile memory device 30 according to the first method is described below as an example.

In the context of the following description, the nonvolatile memory device 30 is a NAND flash memory. However, the present invention is not limited thereto. Rather, the nonvolatile memory device 30 may include any of a ferroelectric random access memory (RAM) (FRAM), a phase-change RAM (PRAM), a magneto-resistive RAM (MRAM), a resistive RAM (RRAM or ReRAM), and an electrically erasable programmable ROM (EEPROM). The nonvolatile memory device 30 may include a plurality of memory elements. The plurality of memory elements may include a plurality of memory blocks. The nonvolatile memory device 30 may be divided into a user storage region where a user can write or read data and a non-user storage region which cannot be used by a user. The non-user storage region may include device firmware and a flash translation layer (FTL) with meta data stored therein.

The controller 20 may include a memory 21 and a reset manager circuitry 22. The reset manager circuitry, as well as each of its constituent elements (described below) may be implemented with any suitable combination of hardware, software and firmware.

As used in the disclosure, the term 'circuitry' can refer to all of the following: (a) hardware-only circuit implementations (such as implementations in only analog and/or digital circuitry) and (b) to combinations of circuits and software (and/or firmware), such as (as applicable): (i) to a combination of processor(s) or (ii) to portions of processor(s)/ software (including digital signal processor(s)), software, and memory(ies) that work together to cause an apparatus, such as a mobile phone or server, to perform various functions) and (c) to circuits, such as a microprocessor(s) or a portion of a microprocessor(s), that require software or firmware for operation, even if the software or firmware is not physically present. This definition of 'circuitry' applies to all uses of this term in this application, including in any claims. As a further example, as used in this application, the term "circuitry" would also cover an implementation of merely a processor (or multiple processors) or portion of a processor and its (or their) accompanying software and/or firmware. The term "circuitry" would also cover, for example and if applicable to a particular claim element, an integrated circuit for a storage device.

The memory 21 may include a random access memory (RAM) and a read only memory (ROM). The RAM may serve as a working memory of a central processing unit (CPU). The RAM may serve as a buffer memory or cache memory. The RAM may include a volatile or nonvolatile memory such as a static RAM (SRAM), a dynamic RAM (DRAM), a synchronous DRAM (SDRAM), FRAM, PRAM, MRAM or RRAM. For example, the memory 21 may include a volatile memory. The following description is based on the supposition that the memory 21 is an SRAM. The ROM (not illustrated) may include a ROM code stored therein. The ROM code may be first executed when power is applied to the memory system 110.

The reset manager circuitry 22 may include a first reset circuitry 22A, a second reset circuitry 22B and a firmware (FW) load determination circuitry 22C.

When receiving power from the host 10, the first reset circuitry 22A may first perform a booting sequence, which may be predetermined. The booting sequence may include executing the ROM code, executing the firmware code and initializing a reset default status. The initializing of the reset default status may indicate initializing the reset default status in response to a reset request issued for a particular reason to prepare for an abnormal operation of the firmware, when a reset request is made from the host 10 during the booting sequence or while the memory system 110 operates in a normal mode after the booting sequence. For example, the reset default status may include a bit flip error. The reason why the reset default status is set to the bit flip error is in order to selectively perform firmware loading when a reset request is received from the host 10 while the memory system 110 operates in the normal mode after the booting sequence or when a reset request is received from the host 10 during the booting sequence. That is, when the reset request is received from the host 10 while the memory system 110 operates in the normal mode after the booting sequence, the controller 20 needs to unconditionally reload the firmware from the nonvolatile memory device 30. In this case, response speed to a command received from the host 10 may slow down. Therefore, in accordance with an embodiment, the controller 20 may check whether the reason for the reset request is the bit flip error in case of the reset request, and reload the firmware from the nonvolatile memory device 30 only when the reset request reason is the bit flip error, thereby not only solving the issue that the response speed to the command received from the host 10 slows down, but also determining the actual reset request reason.

When the reset request is received from the host 10 during the booting sequence, the controller 20 may check whether the reset request reason is the bit flip error, and reload the firmware from the nonvolatile memory device 30 only in the case where the reset request reason is the bit flip error, thereby reducing the booting time.

Hereafter, the case in which a reset request is received from the host 10 during the normal mode after the booting sequence is described. When a reset request is received from the host 10 during the normal mode after the booting sequence, the second reset circuitry 22B may determine the reason for the reset request, using the reset default status set by the first reset circuitry 22A. That is, the second reset circuitry 22B may determine whether the reset request reason is a bit flip error. When the determination result indicates that the reset request reason is not the bit flip error, the second reset circuitry 22B may determine an actual reset request reason, delete the reset default status, and then update the reset default status to reflect the actual reset request reason. On the other hand, when the reset request reason is the bit flip error, the second reset circuitry 22B may not update the reset default status. After determining the reset request reason, the second reset circuitry 22B may reset the memory system 110. The second reset circuitry 22B may determine whether the resetting of the memory system 110 failed, using a watchdog timer or the like to set a reset time of the memory system 110. When the determination result using the watchdog timer indicates that the resetting of the memory system 110 succeeded, the second reset circuitry 22B may end the procedure. On the other hand, when the determination result indicates that the resetting of the memory system 110 failed, the second reset circuitry 22B may retry to reset the memory system 110.

The firmware load determination circuitry 22C may check whether to read the firmware, using the reset default status. That is, when the reset default status is the bit flip error, the firmware may be reread from the nonvolatile memory device 30. On the other hand, when the reset default status is not the bit flip error, the firmware may not be reread.

Figure 2:
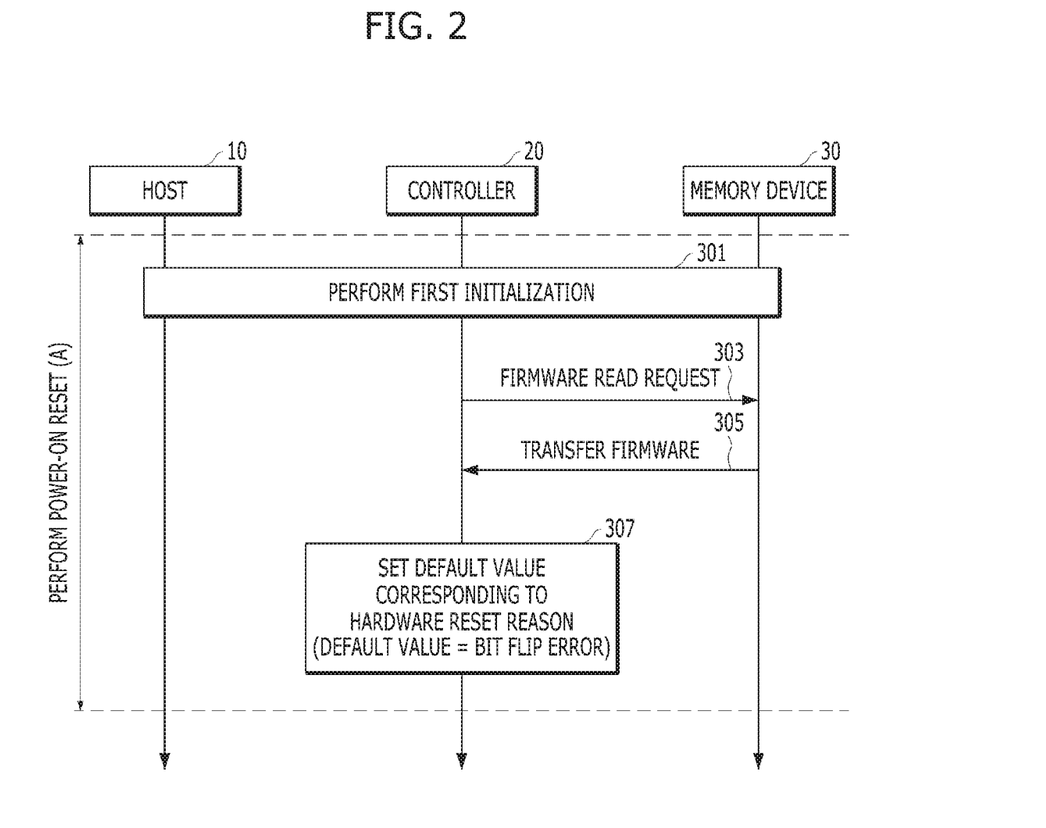
FIGS. 2 to 4 illustrate examples of an operating method of a data processing system including a memory system in accordance with an embodiment of the present invention.
Figure 3:
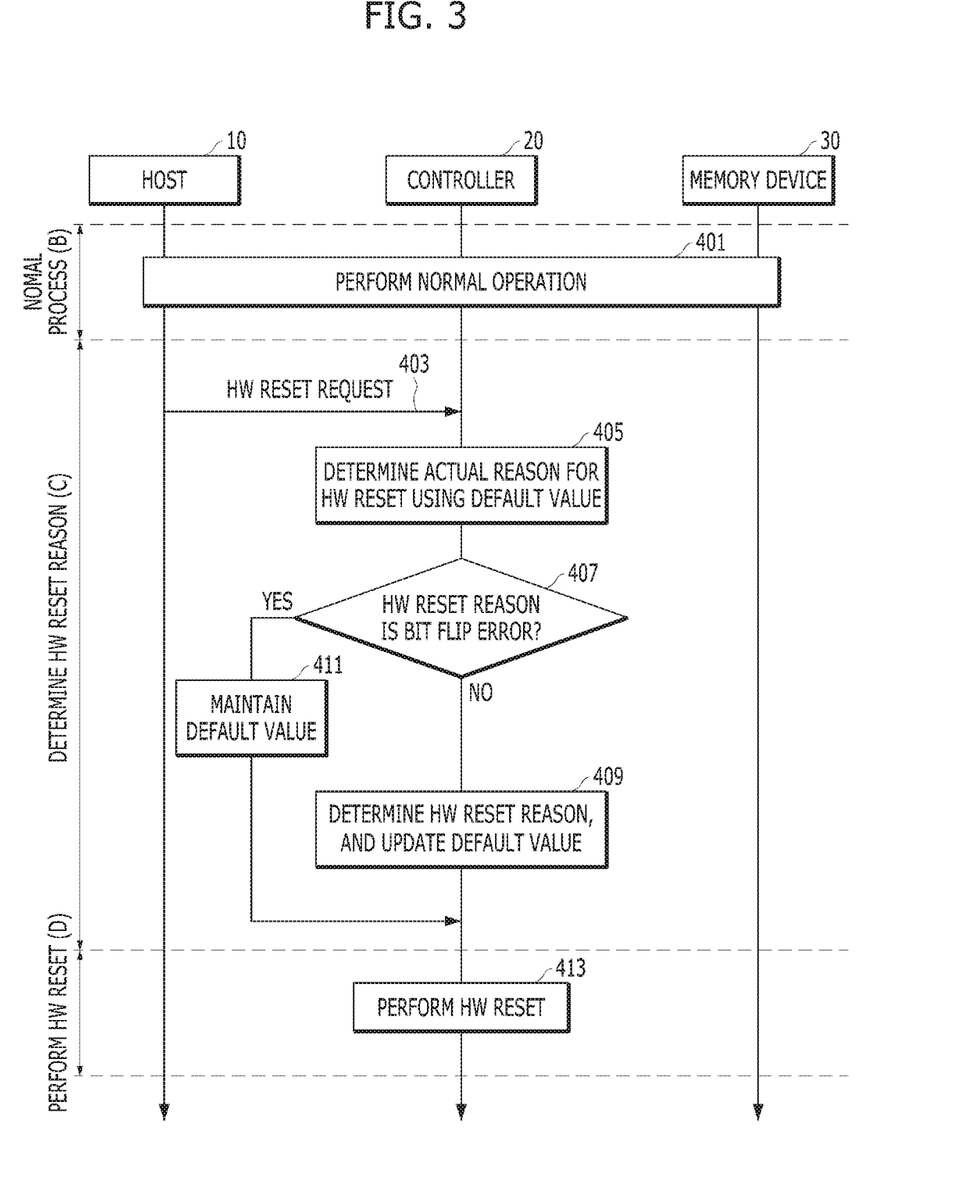
Figure 4:
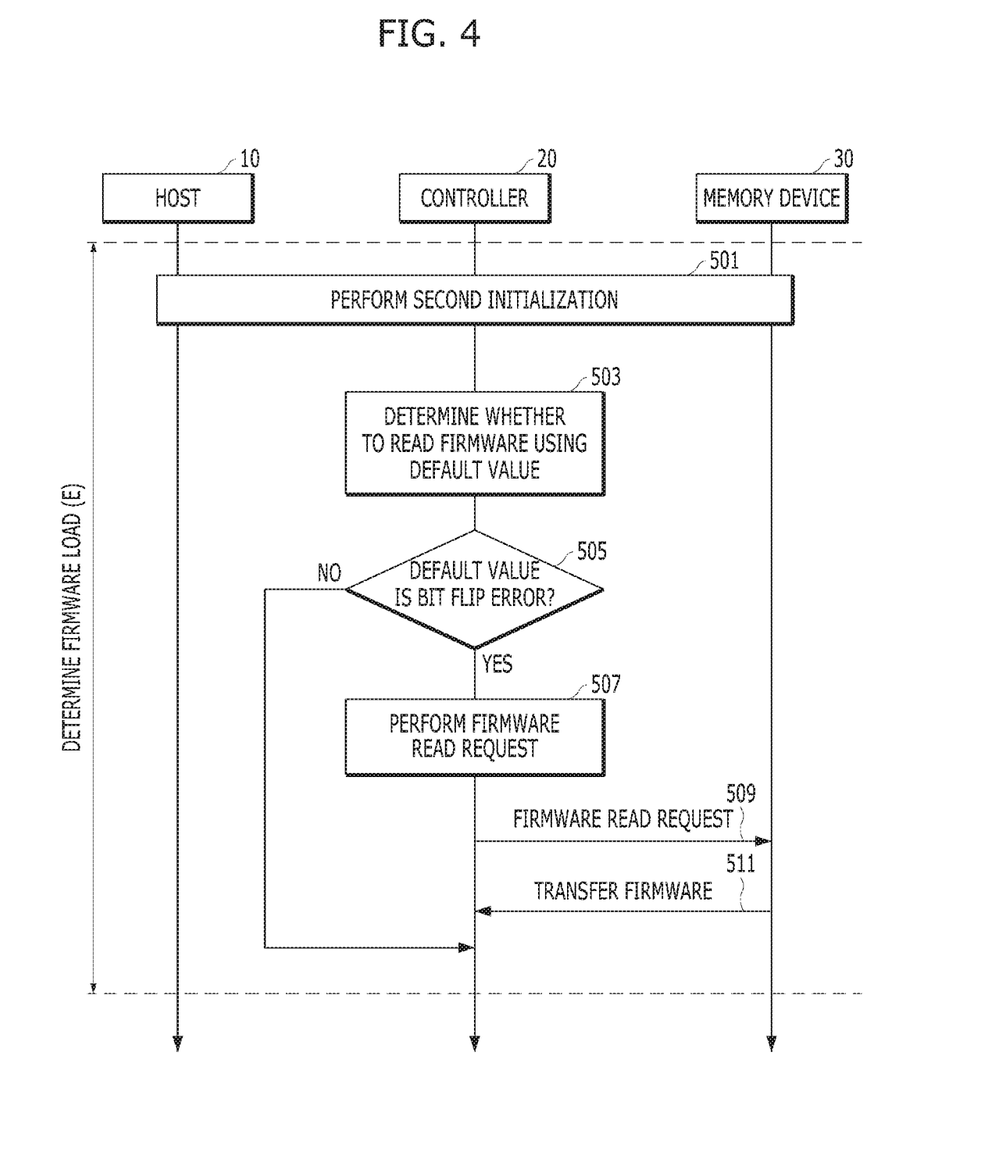

FIGS. 2 to 4 illustrate examples of an operating method of the data processing system including the memory system 110 in accordance with embodiments. FIG. 2 illustrates a method for performing (A) a power-on reset and setting a reset default status. FIG. 3 illustrates a method for performing (D) a hardware (HW) reset after determining (C) the reason for HW reset, when a reset request is received during a normal operation (i.e., normal process (B)). FIG. 4 illustrates a method for determining (E) whether to load firmware depending on the reset default status.

Referring to FIG. 2, the controller 20 may first perform a booting sequence (i.e., first initialization) when receiving power from the host 10 (i.e., power on), at steps 301 to 307. At step 301, the booting sequence may include executing the ROM code, executing the firmware code and initializing the reset default status. After the power-on operation, the controller 20 may perform an operation of checking whether a signal (e.g., Link-startup, NOP OUT, NOP IN) can be normally transferred between the host 10 and the memory system 110. Then, the controller 20 may perform an operation of checking whether data (e.g., Read Descriptor, Device Descriptor) can be read from the nonvolatile memory device 30 included in the memory system 110. Then, the controller 20 may read test data (e.g., Test Unit Ready) from a boot loader region of the nonvolatile memory device 30 and check whether the test data are normally read. Then, at steps 303 and 305, the controller 20 may transmit a firmware read request to the nonvolatile memory device 30 and read the firmware from the nonvolatile memory device 30. When the booting sequence is completed through such process, at step 307, the controller 20 may set the reset default status. That is, the controller 20 may initialize the reset default status based on the reset request reason to prepare for an abnormal operation of the firmware, when a reset request is made from the host 10 during the booting sequence or while the memory system 110 operates in a normal mode after the booting sequence. For example, the reset default status may include a bit flip error. The reason why the reset default status is set to the bit flip error is in order to selectively perform firmware loading when a reset request is received from the host 10 while the memory system 110 operates in the normal mode after the booting sequence or when a reset request is received from the host 10 during the booting sequence. That is, when the reset request is received from the host 10 while the memory system 110 operates in the normal mode after the booting sequence, the controller 20 needs to reload the firmware from the nonvolatile memory device 30. In this case, response speed to a command received from the host 10 may slow down. Therefore, the controller 20 in accordance with an embodiment may check whether the reset request reason is the bit flip error in case of the reset request, and reload the firmware from the nonvolatile memory device 30 only when the reset request reason is the bit flip error, thereby not only solving the concern that the response speed to the command received from the host 10 slows down, but also determining the actual reset request reason.

When the reset request is received from the host 10 during the booting sequence, the controller 20 may check whether the reset request reason is the bit flip error, and reload the firmware from the nonvolatile memory device 30 only in the case where the reset request reason is the bit flip error, thereby reducing the booting time.

Hereafter, the case in which a reset request is received from the host 10 during the normal mode after the booting sequence is described with reference to FIG. 3.

Before describing FIG. 3, methods for resetting the memory system 110 according to a reset request from the host 10 are described. A first method is that the host 10 directly resets both the controller 20 and the nonvolatile memory device 30. A second method is that the host 10 resets only the nonvolatile memory device 30 through the controller 20. A difference between the first and second methods depends on whether the controller 20 as well as the nonvolatile memory device 30 is reset when the memory system 110 is reset according to a request of the host 10. That is, in the first method, both the controller 20 and the nonvolatile memory device 30 are reset. In the second method, however, the controller 20 is not reset; only the nonvolatile memory device 30 is reset. For reference, the reason why the difference between the first and second methods is present is that there are a variety of hosts. That is, as described with reference to FIG. 1, the memory system 110 may be used with various types of hosts. Depending on the type of the host 10, the memory system 110 may be reset according to the first method or the second method. In general, the operation of resetting the memory system 110 according to the first method may indicate that the host 10 resets the memory system 110 through a hardware reset method. Furthermore, the operation of resetting the memory system 110 according to the second method may indicate that the host 10 resets the memory system 110 through an endpoint reset method. In an embodiment, the hardware reset method to reset both the controller 20 and the nonvolatile memory device 30 according to the first method will be taken as an example for description.

Referring to FIG. 3, the data processing system may perform an operation based on a normal process (i.e., normal operation) after the booting sequence, at step 401. The normal process may include a write operation, read operation and the like.

When receiving a reset request (e.g., hardware (HW) reset request) from the host 10 during the normal operation at step 403, the controller 20 may determine the reason for the reset request using the reset default status at steps 405 and 407. That is, the controller 20 may determine whether the reset request reason is the bit flip error. When the determination result indicates that the reset request reason is not the bit flip error (step 407, NO), at step 409, the controller 20 may determine the actual reset request reason, delete the reset default status, and then update the reset default status to reflect the actual reset request reason. On the other hand, when the reset request reason is the bit flip error (step 407, YES), at step 411, the controller 20 may not update the reset default status and may maintain the reset default status as the default value. After determining the reset request reason, i.e., after steps 409 or 411, the controller 20 may reset the memory system 110 at step 413. The controller 20 may determine whether the resetting of the memory system 110 failed, using a watchdog timer to set a reset time of the memory system 110. When the determination result using the watchdog timer indicates that the resetting of the memory system 110 succeeded, the controller 20 may end the procedure. On the other hand, when the determination result indicates that the resetting of the memory system 110 failed, the controller 20 may retry to reset the memory system 110.

Referring to FIG. 4, the data processing system may perform second initialization at step 501. Since the second initialization is performed in the same manner as the booting sequence corresponding to the first initialization described with reference to FIG. 3, detailed description thereof is omitted herein.

At steps 503 and 505, the controller 20 may determine whether to read the firmware, using the reset default status (i.e., default value). That is, when the reset default status is the bit flip error (step 505, YES), the controller 20 may reread firmware from the nonvolatile memory device 30 at steps 507 and 511. On the other hand, when the reset default status is not the bit flip error (step 505, NO), the controller 20 may not reread the firmware from the nonvolatile memory device 30.

With reference to FIGS. 5 to 13, a data processing system and electronic appliances, to which the memory system 110 including the memory device 30 and the controller 20, may be applied, in accordance with embodiments, are described.

Figure 5:
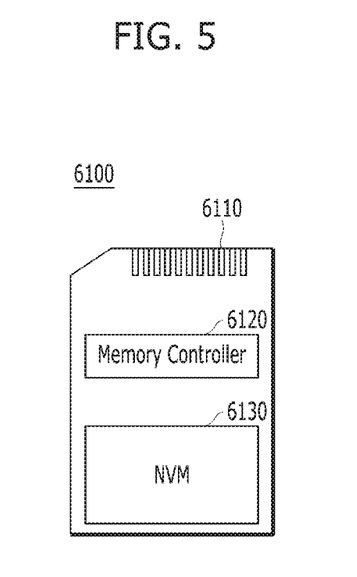
FIGS. 5 to 13 are diagrams illustrating exemplary applications of a memory system in accordance with embodiments of the present invention.

FIG. 5 is a diagram illustrating a data processing system including a memory system 110 in accordance with an embodiment. FIG. 5 illustrates a memory card system 6100 to which the memory system 110 is applied.

Referring to FIG. 5, the memory card system 6100 includes a connector 6110, a memory controller 6120 and a memory device 6130.

The memory controller 6120 is connected with, for access to, the memory device 6130, which is implemented as a nonvolatile memory (NVM). For example, the memory controller 6120 controls the read, write, erase and background operations of the memory device 6130. The memory controller 6120 provides an interface between the memory device 6130 and a host (not shown), and drives firmware for controlling the memory device 6130. That is to say, the memory controller 6120 may correspond to the controller 20 in the memory system 110 described above with reference to FIG. 1, and the memory device 6130 may correspond to the memory device 30 in the memory system 110 described above with reference to FIG. 1.

Therefore, the memory controller 6120 may include components such as a random access memory (RAM), a processor, a host interface, a memory interface and an error correction component.

The memory controller 6120 may communicate with an external device, for example, the host 102 described above with reference to FIG. 1, through the connector 6110. For example, as described above with reference to FIG. 1, the memory controller 6120 may be configured to communicate with the external device through at least one of various communication protocols such as universal serial bus (USB), multimedia card (MMC), embedded MMC (eMMC), peripheral component interconnection (PCI), PCI express (PCIe), advanced technology attachment (ATA), serial ATA, parallel ATA, small computer system interface (SCSI), enhanced small disk interface (ESDI), integrated drive electronics (IDE), Firewire, universal flash storage (UFS), wireless fidelity (WiFi or Wi-Fi) and Bluetooth. Accordingly, the memory system 110 and the data processing system in accordance with an embodiment may be applied to wired and/or wireless electronic appliances, particularly a mobile electronic appliance.

The memory device 6130 may be implemented by a nonvolatile memory such as an electrically erasable and programmable ROM (EPROM), a NAND flash memory, a NOR flash memory, a phase-change RAM (PRAM), a resistive RAM (ReRAM), a ferroelectric RAM (FRAM) and/or a spin-transfer torque magnetic RAM (STT-MRAM).

The controller 6120 and the memory device 6130 may be integrated into one semiconductor device to form a solid state drive (SSD), or a memory card such as a PC card (e.g., personal computer memory card international association (PCMCIA)), a compact flash card (CF), a smart media card (e.g., SM and SMC), a memory stick, a multimedia card (e.g., MMC, RS-MMC, MMCmicro and eMMC), a secure digital (SD) card (e.g., SD, miniSD, microSD and SDHC) or a universal flash storage (UFS).

Figure 6:
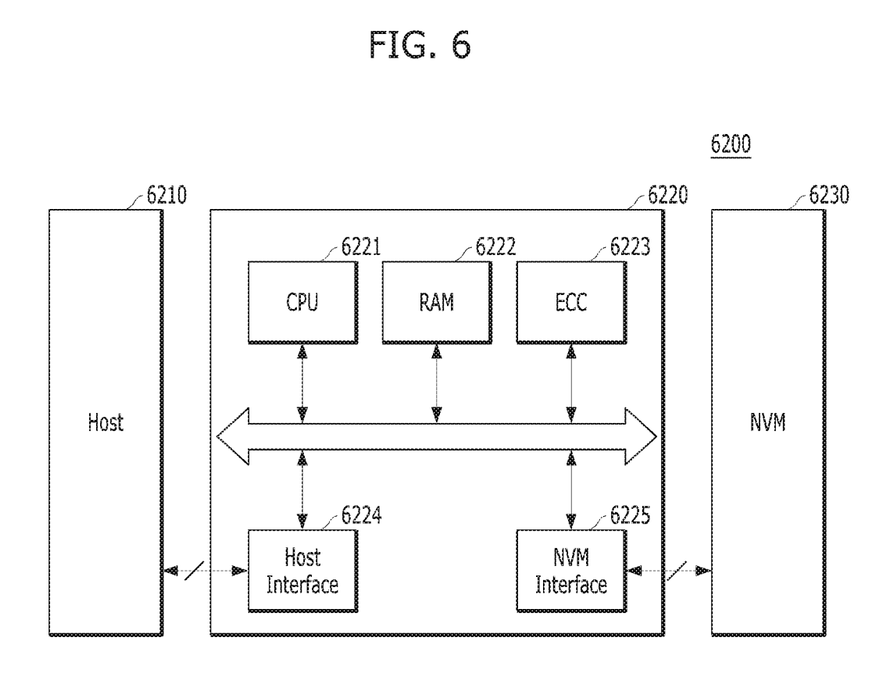

FIG. 6 is a diagram illustrating a data processing system 6200 including a memory system 110 in accordance with an embodiment.

Referring to FIG. 6, the data processing system 6200 includes a memory device 6230 which is implemented by at least one nonvolatile memory (NVM) and a memory controller 6220 which controls the memory device 6230. The data processing system 6200 may be a storage medium such as a memory card (e.g., CF, SD and microSD).

The memory controller 6220 controls read, write and erase operations for the memory device 6230 in response to requests from a host 6210. The memory controller 6220 includes at least one central processing unit (CPU) 6221, a buffer memory, for example, a random access memory (RAM) 6222, an error correction code (ECC) circuit 6223, a host interface 6224, and a memory interface, for example, an NVM interface 6225.

The CPU 6221 may control general operations for the memory device 6230, for example, read, write, file system management, bad page management, and the like. The RAM 6222 operates according to control of the CPU 6221, and may be used as a work memory, a buffer memory, a cache memory, or the like. In the case where the RAM 6222 is used as a work memory, data processed by the CPU 6221 is temporarily stored in the RAM 6222. In the case where the RAM 6222 is used as a buffer memory, the RAM 6222 is used to buffer data to be transmitted from the host 6210 to the memory device 6230 or from the memory device 6230 to the host 6210. In the case where the RAM 6222 is used as a cache memory, the RAM 6222 may be used to enable the memory device 6230 to operate at a high speed.

The ECC circuit 6223 generates an error correction code (ECC) for correcting a failed bit or an error bit in the data received from the memory device 6230. Also, the ECC circuit 6223 performs error correction encoding for data to be provided to the memory device 6230, and generates data with added parity bits. The parity bits may be stored in the memory device 6230. The ECC circuit 6223 may perform error correction decoding for data outputted from the memory device 6230. The ECC circuit 6223 may correct errors by using the parity bits. For example, as described above with reference to FIG. 1, the ECC circuit 6223 may correct errors by using various coded modulations such as a Low Density Parity Check (LDPC) code, a Bose-Chaudhri-Hocquenghem (BCH) code, a turbo code, a Reed-Solomon code, a convolution code, a Recursive Systematic Code (RSC), a Trellis-Coded Modulation (TCM) and a Block coded modulation (BCM).

The memory controller 6220 exchanges data with the host 6210 through the host interface 6224, and exchanges data with the memory device 6230 through the NVM interface 6225. The host interface 6224 may be connected with the host 6210 through a parallel advanced technology attachment (PATA) bus, a serial advanced technology attachment (SATA) bus, a small computer system interface (SCSI), a universal serial bus (USB), a peripheral component interconnect-express (PCIe) or a NAND interface. Further, as a wireless communication function or a mobile communication protocol such as wireless fidelity (WiFi) or long term evolution (LTE) is implemented, the memory controller 6220 may transmit and receive data by being connected with an external device, for example, the host 6210 or another external device. Specifically, as the memory controller 6220 is configured to communicate with an external device through at least one among various communication protocols, the memory system 110 and the data processing system in accordance with an embodiment may be applied to wired and/or wireless electronic appliances, particularly a mobile electronic appliance.

Figure 7:
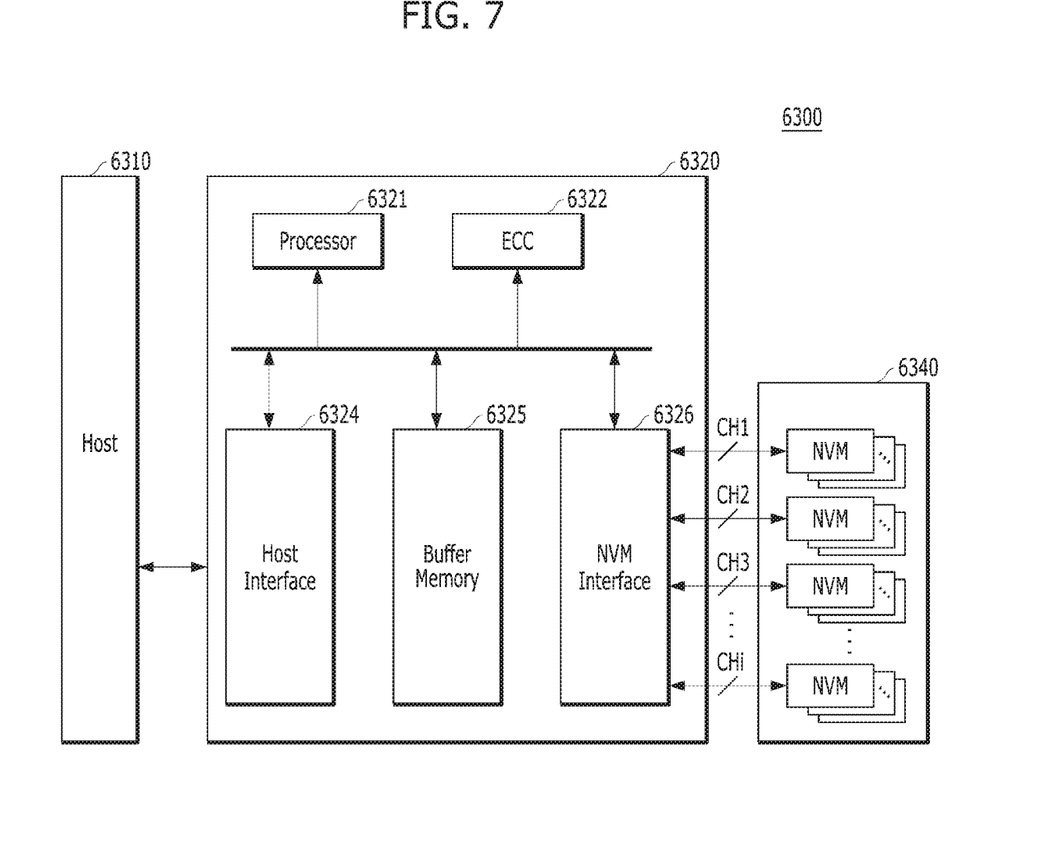

FIG. 7 is a diagram illustrating a data processing system including a memory system 110 in accordance with an embodiment. FIG. 7 illustrates a solid state drive (SSD) 6300 to which the memory system 110 is applied.

Referring to FIG. 7, the SSD 6300 includes a controller 6320 and a memory device 6340 which includes a plurality of nonvolatile memories (NVM). The controller 6320 may correspond to the controller 20 in the memory system 110 described above with reference to FIG. 1, and the memory device 6340 may correspond to the memory device 30 in the memory system 110 described above with reference to FIG. 1.

The controller 6320 is connected with the memory device 6340 through a plurality of channels CH1, CH2, CH3, . . . and CHi. The controller 6320 includes at least one processor 6321, an ECC circuit 6322, a host interface 6324, a buffer memory 6325, and a memory interface, for example, a nonvolatile memory interface 6326.

The buffer memory 6325 temporarily stores data received from a host 6310 or data received from a plurality of flash memories NVMs included in the memory device 6340, or temporarily stores metadata of the plurality of flash memories NVMs, for example, map data including mapping tables. The buffer memory 6325 may be realized by a volatile memory such as, but not limited to, a dynamic random access memory (DRAM), a synchronous DRAM (SDRAM), a double data rate (DDR) SDRAM, a low power DDR (LPDDR) SDRAM and a graphics RAM (GRAM), or a nonvolatile memory such as, but not limited to, a ferro-electric RAM (FRAM), a resistive RAM (RRAM or ReRAM), a spin-transfer torque magnetic RAM (STT-MRAM) and a phase-change RAM (PRAM). While it is illustrated in FIG. 7 that the buffer memory 6325 is disposed inside the controller 6320, the buffer memory 6325 may be disposed external to the controller 6320.

The ECC circuit 6322 calculates error correction code values of data to be programmed in the memory device 6340 in a program operation. The ECC circuit 6322 performs an error correction operation for data read from the memory device 6340, based on the error correction code values, in a read operation. The ECC circuit 6322 performs an error correction operation for data recovered from the memory device 6340 in a recovery operation for failed data.

The host interface 6324 provides an interface function with respect to an external device, for example, the host 6310, and the nonvolatile memory interface 6326 provides an interface function with respect to the memory device 6340 which is connected through the plurality of channels CH1, CH2, CH3, . . . and CHi.

As a plurality of SSDs 6300 to each of which the memory system 110 described above with reference to FIG. 1 is applied are used, a data processing system, for example, a redundant array of independent disks (RAID) system may be implemented. In the RAID system, the plurality of SSDs 6300 and a RAID controller for controlling the plurality of SSDs 6300 may be included. In the case of performing a program operation by receiving a write command from the host 6310, the RAID controller may select at least one memory system 110, that is, at least one SSD 6300, in correspondence to the RAID level information of the received write command received, among a plurality of RAID levels, that is, the plurality of SSDs 6300, and may output data corresponding to the write command to the selected SSD 6300. Also, in the case of performing a read operation by receiving a read command from the host 6310, the RAID controller may select at least one memory system 110, that is, at least one SSD 6300, in correspondence to the RAID level information of the received read command, among the plurality of RAID levels, that is, the plurality of SSDs 6300, and may provide data outputted from the selected SSD 6300 to the host 6310.

Figure 8:
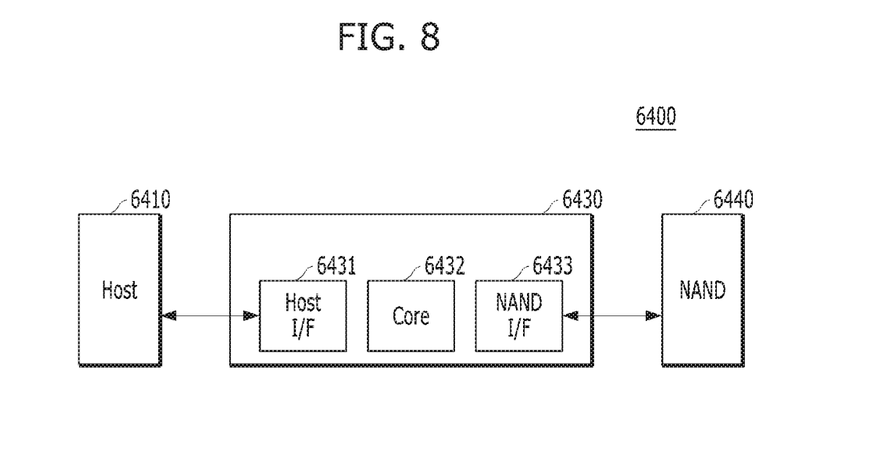

FIG. 8 is a diagram illustrating a data processing system including a memory system 110 in accordance with an embodiment. FIG. 8 illustrates an embedded multimedia card (eMMC) 6400 to which the memory system 110 is applied.

Referring to FIG. 8, the eMMC 6400 includes a controller 6430 and a memory device 6440 which is implemented by at least one NAND flash memory. The controller 6430 may correspond to the controller 20 in the memory system 110 described above with reference to FIG. 1, and the memory device 6440 may correspond to the memory device 30 in the memory system 110 described above with reference to FIG. 1.

The controller 6430 is connected with the memory device 6440 through a plurality of channels. The controller 6430 includes at least one core 6432, a host interface (I/F) 6431, and a memory interface, i.e., a NAND interface (I/F) 6433.

The core 6432 controls general operations of the eMMC 6400. The host interface 6431 provides an interface function between the controller 6430 and a host 6410. The NAND interface 6433 provides an interface function between the memory device 6440 and the controller 6430. For example, the host interface 6431 may be a parallel interface, for example, an MMC interface, may be a serial interface, for example, an ultra high speed (UHS)-I/UHS-II and/or a UFS interface.

Figure 9:
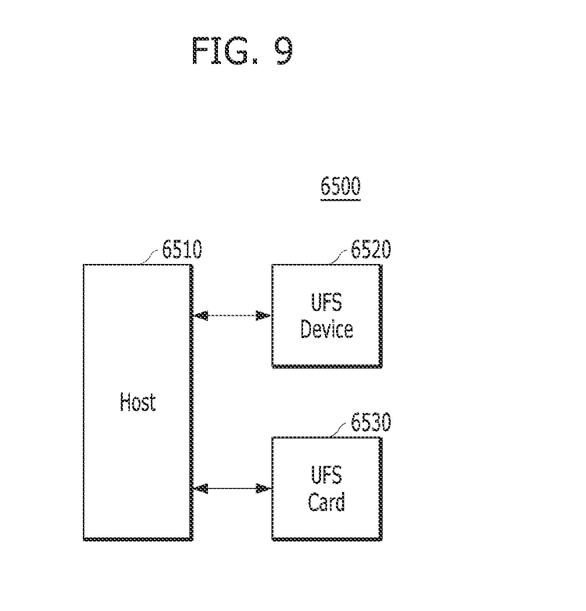
Figure 10:
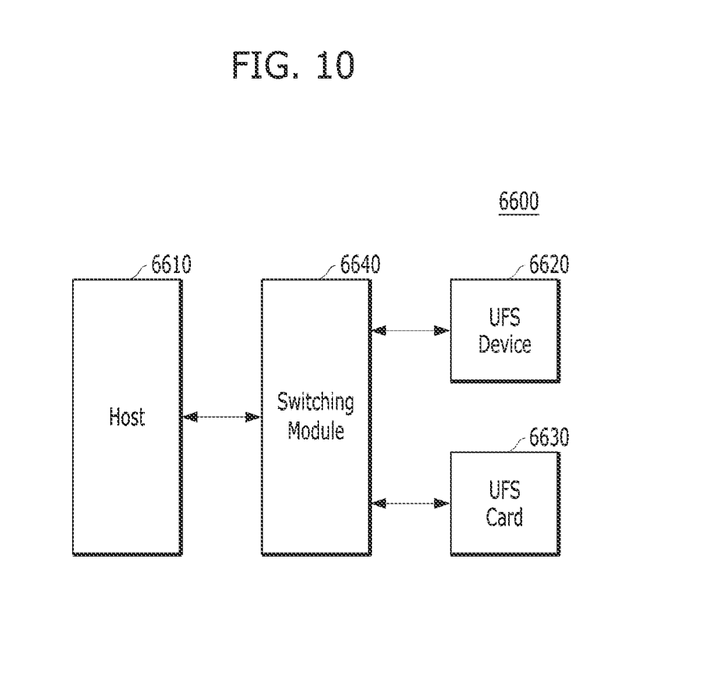
Figure 11:
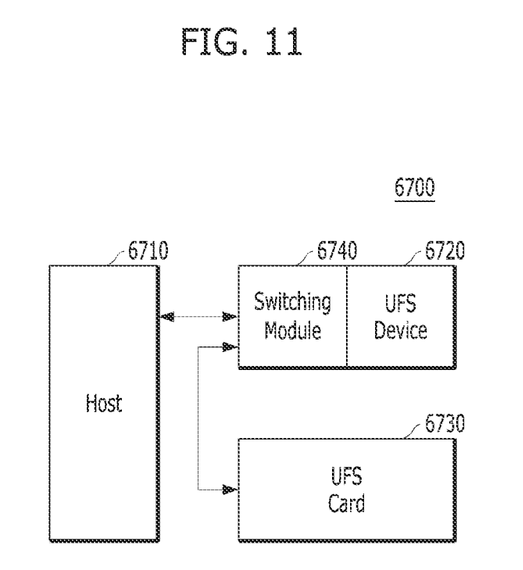

FIGS. 9 to 11 are diagrams illustrating examples of data processing systems including a memory system 110 in accordance with embodiments. Each of FIGS. 9 to 11 illustrates a universal flash storage (UFS) to which the memory system 110 is applied.

Referring to FIGS. 9 to 11, respective UFS systems 6500, 6600, 6700 and 6800 may include hosts 6510, 6610, 6710 and 6810, UFS devices 6520, 6620, 6720 and 6820 and UFS cards 6530, 6630, 6730 and 6830, respectively. The respective hosts 6510, 6610, 6710 and 6810 may be wired and/or wireless electronic appliances, in particular, application processors of mobile electronic appliances or the likes. The respective UFS devices 6520, 6620, 6720 and 6820 may be embedded UFS devices. The respective UFS cards 6530, 6630, 6730 and 6830 may be external embedded UFS devices or removable UFS cards.

In the respective UFS systems 6500, 6600, 6700 and 6800, the hosts 6510, 6610, 6710 and 6810, the UFS devices 6520, 6620, 6720 and 6820 and the UFS cards 6530, 6630, 6730 and 6830 may communicate with external devices, for example, wired and/or wireless electronic appliances, in particular, mobile electronic appliances or the like, through UFS protocols. The UFS devices 6520, 6620, 6720 and 6820 and the UFS cards 6530, 6630, 6730 and 6830 may be implemented as the memory system 110 described above with reference to FIG. 1. For example, in the respective UFS systems 6500, 6600, 6700 and 6800, the UFS devices 6520, 6620, 6720 and 6820 may be implemented in the form of the data processing system 6200, the SSD 6300 or the eMMC 6400 described above with reference to FIGS. 6 to 8, and the UFS cards 6530, 6630, 6730 and 6830 may be implemented in the form of the memory card system 6100 described above with reference to FIG. 5.

In the respective UFS systems 6500, 6600, 6700 and 6800, the hosts 6510, 6610, 6710 and 6810, the UFS devices 6520, 6620, 6720 and 6820 and the UFS cards 6530, 6630, 6730 and 6830 may perform communication through the universal flash storage (UFS) interface, for example, MIPI M-PHY and MIPI Unified Protocol (UniPro) in Mobile Industry Processor Interface (MIPI). The UFS devices 6520, 6620, 6720 and 6820 and the UFS cards 6530, 6630, 6730 and 6830 may perform communication through another protocol other than the UFS protocol, for example, any of various card protocols such as universal storage bus (USB) Flash Drives (UFDs), multi-media card (MMC), secure digital (SD), mini SD and Micro SD.

In the UFS system 6500 shown in FIG. 9, UniPro exists in each of the host 6510, the UFS device 6520 and the UFS card 6530. The host 6510 performs a switching operation to perform communication with each of the UFS device 6520 and the UFS card 6530. In particular, the host 6510 performs communication with the UFS device 6520 or the UFS card 6530, through link layer switching in UniPro, for example, L3 switching. The UFS device 6520 and the UFS card 6530 may perform communication through link layer switching in the UniPro of the host 6510. While it is described as an example that one UFS device 6520 and one UFS card 6530 are coupled to the host 6510, it is noted that a plurality of UFS devices and a plurality of UFS cards may be coupled to the host 6510 in a parallel or a star type arrangement. Also, a plurality of UFS cards may be coupled to the UFS device 6520 in any of a parallel, a star, a serial or a chain type arrangement.

In the UFS system 6600 shown in FIG. 10, UniPro exists in each of the host 6610, the UFS device 6620 and the UFS card 6630. The host 6610 performs communication with the UFS device 6620 or the UFS card 6630 through a switching module 6640 which performs a switching operation, in particular, a switching module 6640 which performs link layer switching in UniPro, for example, an L3 switching operation. The UFS device 6620 and the UFS card 6630 may perform communication through link layer switching in the UniPro of the switching module 6640. While it is described as an example that one UFS device 6620 and one UFS card 6630 are coupled to the switching module 6640, it is noted that a plurality of UFS devices and a plurality of UFS cards may be coupled to the switching module 6640 in a parallel type or a star type arrangement. Also, a plurality of UFS cards may be coupled to the UFS device 6620 in any of a parallel, a star, a serial or a chain type arrangement.

In the UFS system 6700 shown in FIG. 11, UniPro exists in each of the host 6710, the UFS device 6720 and the UFS card 6730. The host 6710 performs communication with the UFS device 6720 or the UFS card 6730 through a switching module 6740 which performs a switching operation, in particular, the switching module 6740 which performs link layer switching in UniPro, for example, an L3 switching operation. The UFS device 6720 and the UFS card 6730 may perform communication through link layer switching in the UniPro of the switching module 6740. The switching module 6740 may be implemented as one module with the UFS device 6720 inside or outside the UFS device 6720. While it is described as an example that one UFS device 6720 and one UFS card 6730 are coupled to the switching module 6740, it is noted that a plurality of modules in which the switching module 6740 and the UFS device 6720 are respectively implemented may be coupled to the host 6710 in a parallel type or a star type arrangement. Also, respective modules may be coupled in a serial type or a chain type arrangement, or a plurality of UFS cards may be coupled to the switching module 6740 in a parallel type or a star type arrangement.

Figure 12:
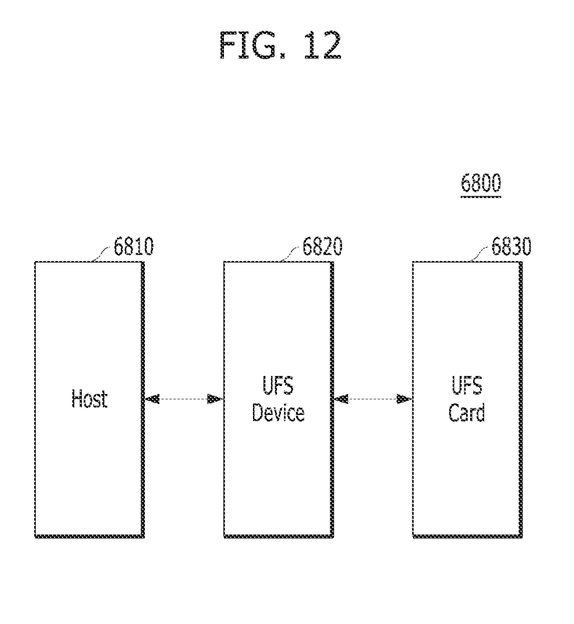

In the UFS system 6800 shown in FIG. 12, M-PHY and UniPro exist in each of the host 6810, the UFS device 6820 and the UFS card 6830. The UFS device 6820 performs a switching operation to perform communication with the host 6810 and the UFS card 6830. In particular, the UFS device 6820 performs communication with the host 6810 or the UFS card 6830, through switching between M-PHY and UniPro modules for communication with the host 6810 and M-PHY and UniPro modules for communication with the UFS card 6830, for example, target identifier (ID) switching. The host 6810 and the UFS card 6830 may perform communication through target ID switching between M-PHY and UniPro modules of the UFS device 6820. While it is described as an example that one UFS device 6820 is coupled to the host 6810 and one UFS card 6830 is coupled to one UFS device 6820, it is noted that a plurality of UFS devices may be coupled to the host 6810 in a parallel type or a star type arrangement. Also, a plurality of UFS cards may be coupled to one UFS device 6820 in any of a parallel, a star, a serial, or a chain type arrangement.

Figure 13:
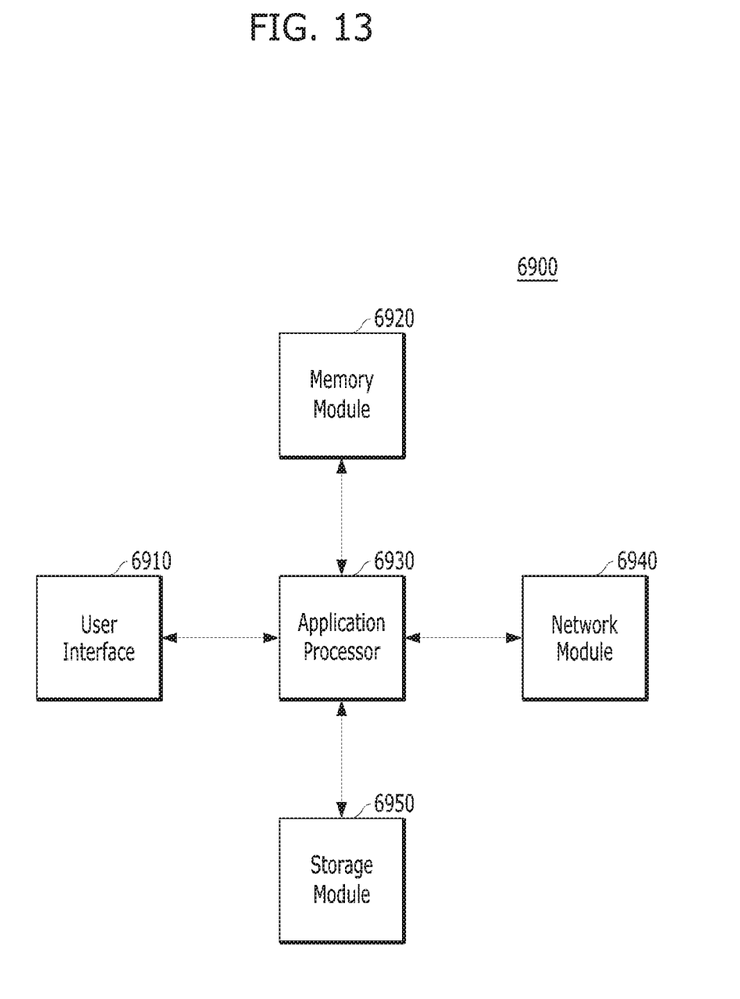

FIG. 13 is a diagram illustrating a data processing system including a memory system 110 in accordance with an embodiment. FIG. 13 illustrates a user system 6900 to which the memory system 110 is applied.

Referring to FIG. 13, the user system 6900 includes a user interface 6910, a memory module 6920, an application processor 6930, a network module 6940, and a storage module 6950.

The application processor 6930 drives components included in the user system 6900 and an operating system (OS). For example, the application processor 6930 may include controllers for controlling the components included in the user system 6900, interfaces, graphics engines, and other components. The application processor 6930 may be provided as a system-on-chip (SoC).

The memory module 6920 may operate as a main memory, a working memory, a buffer memory or a cache memory of the user system 6900. The memory module 6920 may include a volatile random access memory (RAM) such as a dynamic RAM (DRAM), a synchronous DRAM (SDRAM), a double data rate (DDR) SDRAM, a DDR2 SDRAM, a DDR3 SDRAM, a low power DDR (LPDDR) SDRAM, an LPDDR2 SDRAM and/or an LPDDR3 SDRAM, or a nonvolatile random access memory such as a phase-change RAM (PRAM), a resistive RAM (ReRAM), a magneto-resistive RAM (MRAM) and/or a ferroelectric RAM (FRAM). For example, the application processor 6930 and the memory module 6920 may be mounted as a package-on-package (PoP).

The network module 6940 may communicate with external devices. For example, the network module 6940 may support not only wired communications but also various wireless communications such as code division multiple access (CDMA), global system for mobile communication (GSM), wideband CDMA (WCDMA), CDMA-2000, time division multiple access (TDMA), long term evolution (LTE), worldwide interoperability for microwave access (WiMAX), wireless local area network (WLAN), ultra-wideband (UWB), Bluetooth, wireless display (WI-DI), and the like, and may thereby communicate with wired and/or wireless electronic appliances, particularly a mobile electronic appliance. As a result, the memory system 110 and the data processing system may be applied to wired and/or wireless electronic appliances. The network module 6940 may be included in the application processor 6930.

The storage module 6950 may store data, for example, data received from the application processor 6930, and transmit data stored therein to the application processor 6930. The storage module 6950 may be implemented by any of a nonvolatile memory such as a phase-change RAM (PRAM), a magnetic RAM (MRAM), a resistive RAM (ReRAM), a NAND flash memory, a NOR flash memory and a 3-dimensional NAND flash memory. Also, the storage module 6900 may be provided as a removable storage medium such as a memory card of the user system 6900 or an external drive. That is to say, the storage module 6950 may correspond to the memory system 110 described above with reference to FIG. 1, and may be implemented as the SSD, eMMC and UFS described above with reference to FIGS. 8 to 13.

The user interface 6910 may include interfaces for inputting data or commands to the application processor 6930 or for outputting data to an external device. For example, the user interface 6910 may include user input interfaces such as a keyboard, a keypad, a button, a touch panel, a touch screen, a touch pad, a touch ball, a camera, a microphone, a gyroscope sensor, a vibration sensor and a piezoelectric element, and user output interfaces such as a liquid crystal display (LCD), an organic light emitting diode (OLED) display device, an active matrix OLED (AMOLED) display device, an LED, a speaker and a motor.

In the case where the memory system 110 described above with reference to FIG. 1 is applied to the mobile electronic appliance of the user system 6900 in accordance with an embodiment, the application processor 6930 controls general operations of the mobile electronic appliance, and the network module 6940 as a communication module controls wired and/or wireless communication with an external device, as described above. The user interface 6910 as the display and touch module of the mobile electronic appliance displays data processed by the application processor 6930 or supports input of data from a touch panel.

In accordance with embodiments, a controller receiving a reset request from a host may determine the reason for the reset based on a set default status, and determine whether to load the firmware from a memory device. Through the operation, the controller may reduce the booting time.

Furthermore, the controller receiving a reset request may determine the reason for the reset based on the set default status, thereby determining an actual reset reason.

While the present invention has been illustrated and described with respect to the specific embodiments, it will be apparent to those skilled in the art in light of the present disclosure that various changes and modifications may be made without departing from the spirit and scope of the invention as defined in the following claims.

What is claimed is:

1. A data processing system comprising:
   a host; and
   a memory system comprising a nonvolatile memory device and a controller suitable for controlling the nonvolatile memory device,
   wherein the controller comprises:
   a first reset circuitry suitable for loading firmware from the nonvolatile memory device to a volatile memory, and setting a reset parameter to a default value;
   a second reset circuitry suitable for, when a reset request is received from the host, determining a reason for the reset request, updating the reset parameter based on the reason for the reset request, and resetting the memory system; and
   a firmware load determination circuitry suitable for, when a power is applied to the memory system after the memory system is reset, determining whether to reload the firmware by checking whether the reset parameter has a bit-flip-error value which indicates that the reason for the reset request is a bit flip error of the volatile memory,
   wherein the second reset circuitry determines whether the reason for the reset request is a bit flip error, maintains the reset parameter as the bit flip error value when the reason for the reset request is the bit flip error, and resets the memory system.

2. The data processing system of claim 1, wherein the second reset circuitry comprises a timer suitable for setting a reset time of the memory system, and determines whether the resetting of the memory system failed, using the timer.

3. The data processing system of claim 1, wherein the first reset circuitry sets the default value to the bit-flip-error value.

4. The data processing system of claim 1, wherein the second reset circuitry determines whether the reason for the reset request is the bit flip error, checks the reason for the reset request through the reset request to update the reset parameter when the reason for the reset request is not the bit flip error, and then resets the memory system.

5. The data processing system of claim 4, wherein the firmware load determination circuitry checks the reset parameter determined through the second reset circuitry, and does not load the firmware from the nonvolatile memory device when the reset parameter does not have the bit-flip-error value.

6. The data processing system of claim 1, wherein the firmware load determination circuitry checks the reset parameter determined through the second reset circuitry, and reloads the firmware from the nonvolatile memory device when the reset parameter has the bit-flip-error value.

7. The data processing system of claim 1, wherein the reset request comprises any one of a hardware reset through which the host directly resets both the controller and the nonvolatile memory device and an end point reset through which the host resets only the nonvolatile memory device through the controller.

8. An operating method of a data processing system which includes a host; and a memory system including a nonvolatile memory device and a controller for controlling the nonvolatile memory device, the operating method comprising:
   loading firmware from the nonvolatile memory device to a volatile memory, and setting a reset parameter to a default value;
   determining, when a reset request is received from the host, a reason for the reset request, updating the reset parameter based on the reason for the reset request, and resetting the memory system; and
   determining, when a power is applied to the memory system after the memory system is reset, whether to reload the firmware by checking whether the reset parameter has a bit-flip-error value which indicates that the reason for the read request is a bit flip of the volatile memory,
   wherein the determining the reason for the reset request comprises determining whether the reason for the reset request is the bit flip error, maintaining the reset parameter as the bit flip error value when the reason for the reset request is the bit flip error, and resetting the memory system.

9. The operating method of claim 8, wherein the data processing system further comprises a timer suitable for setting a reset time of the memory system, and determines whether the resetting of the memory system failed, using the timer.

10. The operating method of claim 8, wherein the default value is the bit-flip-error value.

11. The operating method of claim 8, wherein the determining the reason for the reset request comprises determining whether the reason for the reset request is the bit flip error, checking the reason for the reset request through the reset request to update the reset parameter when the reason for the reset request is not the bit flip error, and resetting the memory system.

12. The operating method of claim 8, wherein the determining of whether to reload the firmware comprises checking whether the reset parameter determined through the determining the reason for the reset request does not have the bit-flip-error value, and not loading the firmware from the nonvolatile memory device when the reset parameter does not have the bit-flip-error value.

13. The operating method of claim 8, wherein the determining of whether to reload the firmware comprises checking whether the reset parameter determined through the determining the reason for reset request has the bit-flip-error value, and reloading the firmware from the nonvolatile memory device when the reset parameter has the bit-flip-error value.

14. The operating method of claim 8, wherein the reset request comprises any one of a hardware reset through which the host directly resets both the controller and the nonvolatile memory device and an end point reset through which the host resets only the nonvolatile memory device through the controller.

15. A memory system comprising:
   a memory device suitable for storing firmware; and
   a controller suitable for controlling the memory device,
   wherein the controller is configured to:
   load the firmware from the memory device;
   reset the memory system according to a reset request, when the reset request is received;
   determine, when power is applied to the memory system after the memory system is reset, whether the firmware is to be reloaded based on whether a reason for the reset request is a bit flip error of a volatile memory;
   reload the firmware from the memory device, when it is determined that the firmware is to be reloaded; and
   maintain a reset parameter as a bit flip error value when it is determined that the reason for the reset request is the bit flip error of the volatile memory.

* * * * *